United States Patent [19]

Suprunov et al.

[11] 4,077,841
[45] Mar. 7, 1978

[54] METHOD AND APPARATUS FOR TREATING SLURRIES

[75] Inventors: Vladimir Suprunov; Alfred Kryczun; Theodor Manshausen, all of Cologne, Germany

[73] Assignee: Klockner-Humboldt-Deutz Aktiengesellschaft, Germany

[21] Appl. No.: 703,017

[22] Filed: Jul. 6, 1976

[30] Foreign Application Priority Data

Jul. 11, 1975 Germany .............................. 2530962

[51] Int. Cl.² .............................................. B01D 1/00
[52] U.S. Cl. ................... 159/47 R; 34/57 A; 34/173; 159/16 R
[58] Field of Search ............ 159/1 RW, 4 A, 47 WL, 159/4 E, 4 SR, 18, 16 R, 47 R, 48 R, 46; 201/32–34; 202/117; 432/58, 159, 151; 34/10, 57 A, 57 R, 58, 79, 102, 122, 129, 131, 168, 169, 171, 178, 201, 209, 210, 212, 218, 219, 226, 227, 228, 173

[56] References Cited

U.S. PATENT DOCUMENTS

| | | | |
|---|---|---|---|
| 1,137,779 | 5/1915 | Moore | 159/4 A |
| 1,932,467 | 10/1933 | Keenan | 159/4 VM |
| 2,015,050 | 9/1935 | Baird et al. | 110/15 |
| 2,402,192 | 6/1946 | Williams et al. | 159/4 SR |
| 2,889,283 | 6/1959 | Tecklenburg | 159/4 SR |
| 3,053,615 | 9/1962 | Steinert | 159/4 A |
| 3,118,658 | 1/1964 | Dennert | 34/57 R |
| 3,309,785 | 3/1967 | King | 34/57 R |
| 3,703,442 | 11/1972 | Rammler et al. | 201/33 |
| 3,759,795 | 9/1973 | Oliver et al. | 201/32 |
| 3,967,975 | 7/1976 | Idaszak | 34/10 |

*Primary Examiner*—Norman Yudkoff
*Attorney, Agent, or Firm*—Hill, Gross, Simpson, Van Santen, Steadman, Chiara & Simpson

[57] ABSTRACT

Method and apparatus for the thermal treatment of slurries such as slurries of magnesite hydrate or the like. The method involves suspending the slurry in an airstream, passing the airstream with the suspended slurry particles into contact with a heated gas stream in a dryer, passing the thus-dried slurry to a multi-tiered heated kiln, introducing heated gases into the kiln for drying contact with the thus dried slurry, and passing the exhaust gases from the kiln to the dryer to serve as the heated gas stream.

6 Claims, 1 Drawing Figure

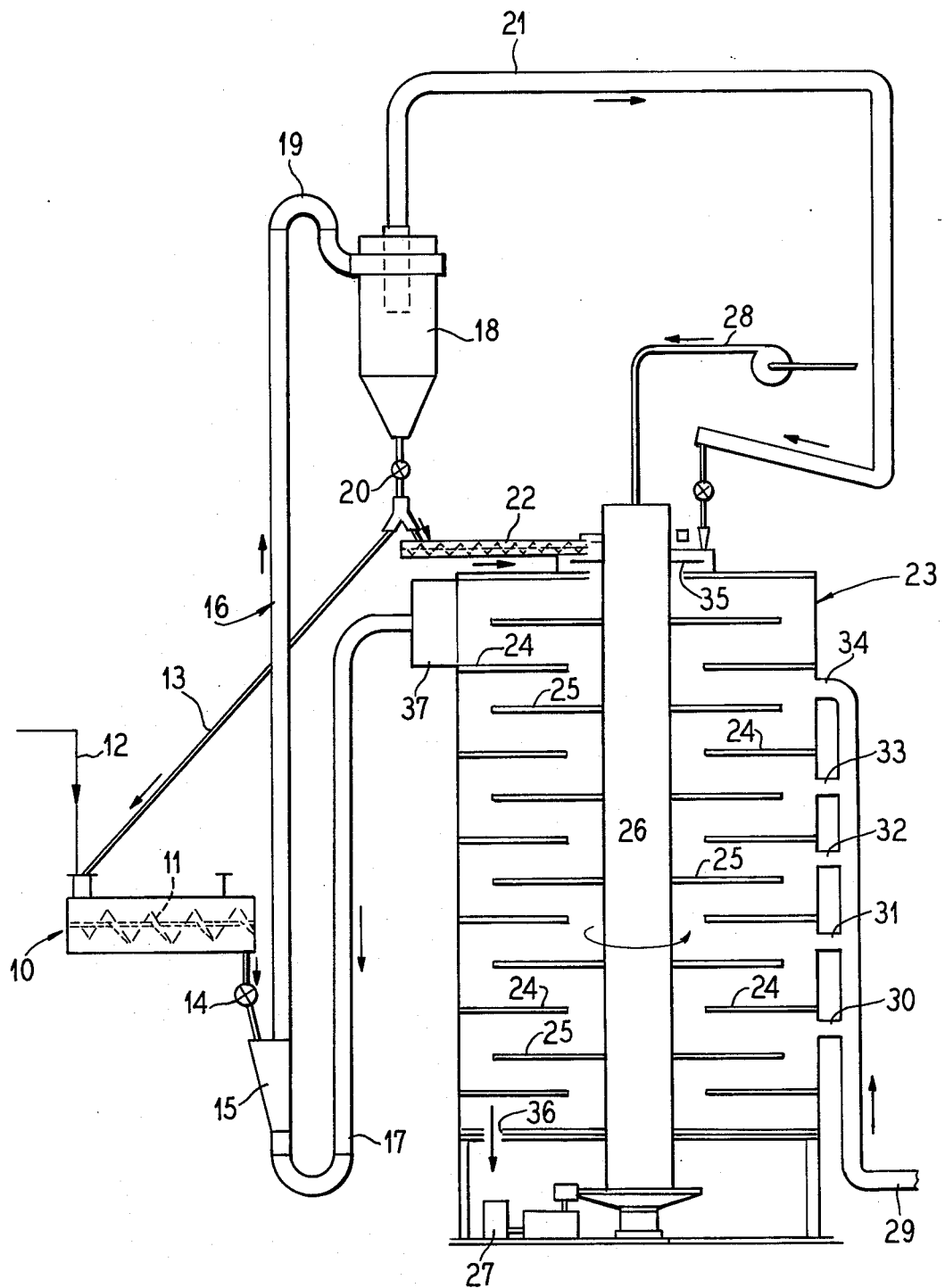

METHOD AND APPARATUS FOR TREATING SLURRIES

BACKGROUND OF THE INVENTION

1. Field of the Invention

This invention is in the field of drying slurries utilizing a pretreatment of the slurry with exhaust gases from the kiln to initiate drying, and then passing the dried slurry to the kiln for further calcination or other treatment.

2. Description of the Prior Art

Previously known methods for the thermal treatment of slurries, such as magnesite hydrate slurries required a relatively high expenditure for equipment. Furthermore, these known methods did not economically use the heat involved and therefore were not particularly efficient.

SUMMARY OF THE INVENTION

The present invention provides a method and apparatus for thermal treatment of slurries in which the slurry is suspended in an airstream and passed into contact with a heated gas stream in a dryer. After leaving the dryer, the dried suspension is then passed to a cyclone separator which delivers the coarser particles separated into a calcining kiln or the like. Preferably, a portion of the coarser particles is recycled and admixed with the sludge entering the dryer. In the kiln, the particles are calcined by means of hot airstreams. The fines collected in the cyclone separator can also be treated concurrently with the coarser particles in the kiln. The exhaust gases leaving the kiln are then passed to the dryer for admixture with the slurry entering the dryer to serve as the suspending medium and as the source of heat in the dryer. The result is an economical process and apparatus for efficiently drying and calcining such slurries.

BRIEF DESCRIPTION OF THE DRAWINGS

Ths single FIGURE of the drawing illustrates rather schematically an apparatus which can be used to carry out the method of the present invention.

DESCRIPTION OF THE PREFERRED EMBODIMENTS

In the FIGURE, reference numeral 10 indicates generally a mixing chamber containing a feed screw 11 and supplied with a slurry such as a magnesite hydrate through a line 12. In the mixing chamber 10, the slurry is combined with coarse hot magnesite particles by means of a conduit 13. The mixture is discharged through a metering valve 14 into an inlet 15 of an elongated dryer 16. The slurry plus the recycled magnesite particles are suspended or fluidized by means of a heated gas stream which enters the dryer 16 through a conduit 17.

The slurry particles in suspension in the hot gases carry over into a cyclone separator 18 through a line 19. The separator 18 is of the conventional type and discharges relatively coarse particles through a valve 20 and relatively fine particles through a dust exhaust conduit 21. The relatively coarse particle discharge is divided into two parts, one portion being recycled to the mixing chamber 10 through the line 13, and a second portion being delivered to a feed worm 22 which directs the relatively coarse particles into a kiln generally indicated at reference numeral 23. This kiln may include a plurality of hearths 24 between which there extend blades 25 secured to a rotor 26. The rotor is driven through a suitable drive mechanism by means of a motor 27. The rotor is cooled by means of a stream of compressed air entering through a line 28.

Heat for the kiln 23 is provided by a hot air supply line 29 which has a plurality of distribution lines 30, 31, 32, 33 and 34 which direct the hot gas into the kiln between a rotor blade 25 and a corresponding hearth 24.

Also introduced into the kiln 23 are the fine particles which are removed from the cyclone separator 18 through the conduit 21. These particles are distributed on a plate 35 along with the relatively coarser material which is fed into the kiln through the worm 22.

As the blades 25 rotate, they distribute the particulate material outwardly by centrifugal force, and the material follows a tortuous path in going through the kiln until it is discharged through a discharge opening 36 at the bottom of the kiln.

The hot exhaust gases are received in a collector 37 and then pass into the conduit 17 for suspending the slurry in the dryer 16, as previously mentioned.

In the dryer 16, the solids present in the slurry are sufficiently pre-dried so that they may be readily separated from the gases in the separator 18. The method and apparatus of the present invention thereby utilize the waste gases efficiently and make it possible to provide a smaller rotary kiln, for example, than has previously been used for calcining slurries of magnesite.

It should be evident that various modifications can be made to the described embodiments without departing from the scope of the present invention.

We claim as our invention:

1. A method for the thermal treatment of a slurry which comprises, passing said slurry into contact with a heated gas stream in a dryer to suspend and dry the particles of said slurry, passing the thus dried slurry particles while so suspended to a multi-tiered heated kiln, introducing heated gases into said kiln for contact with the dried slurry, and passing the exhaust gases from said kiln to said dryer to serve as said heated gas stream.

2. A method according to claim 1 in which the heated gas stream from said dryer is subjected to separation in a cyclone separator, and a portion of the coarse solids recovered from said cyclone separator is admixed with said slurry prior to entering said dryer, the remainder going to said kiln.

3. A method according to claim 2 in which the fines collected in said cyclone separator are also introduced into said kiln.

4. An apparatus for drying a slurry of a magnesite hydrate or the like comprising a multi-tiered kiln, means for introducing heated gases into said kiln, exhaust means for gases leaving said kiln, an elongated dryer, means for introducing a slurry to be dried into said dryer, means connecting said dryer to said exhaust means to deliver heated gases from said kiln to said dryer to thereby suspend slurry particles in said dryer and propel them through said dryer, and means for delivering dried slurry particles into said kiln.

5. An apparatus according to claim 4 which includes a cyclone separator receiving the discharge from said dryer, and means for introducing coarser particles from said cyclone separator into said kiln.

6. An apparatus according to claim 5 which also includes means for mixing a portion of said coarser particles with said slurry prior to introducing said slurry into said dryer.

* * * * *